(12) United States Patent
Xue et al.

(10) Patent No.: US 12,266,344 B2
(45) Date of Patent: Apr. 1, 2025

(54) TEXT INFORMATION PROCESSING METHOD AND APPARATUS

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Liumeng Xue, Beijing (CN); Wei Song, Beijing (CN); Zhizheng Wu, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 288 days.

(21) Appl. No.: 17/789,513

(22) PCT Filed: Jan. 15, 2021

(86) PCT No.: PCT/CN2021/072016
§ 371 (c)(1),
(2) Date: Jun. 27, 2022

(87) PCT Pub. No.: WO2021/179791
PCT Pub. Date: Sep. 16, 2021

(65) Prior Publication Data
US 2022/0406290 A1      Dec. 22, 2022

(30) Foreign Application Priority Data
Mar. 12, 2020   (CN) .................... 202010172575.7

(51) Int. Cl.
*G10L 13/08*       (2013.01)
*G06F 40/30*       (2020.01)

(52) U.S. Cl.
CPC .............. *G10L 13/08* (2013.01); *G06F 40/30* (2020.01)

(58) Field of Classification Search
None
See application file for complete search history.

(56) References Cited

U.S. PATENT DOCUMENTS

| 10,475,438 B1 | 11/2019 | Chicote et al. |
| 2012/0191457 A1 | 7/2012 | Minnis et al. |

(Continued)

FOREIGN PATENT DOCUMENTS

| CN | 1731509 A | 2/2006 |
| CN | 107077841 A | 8/2017 |

(Continued)

OTHER PUBLICATIONS

Communication from European Patent Office dated Mar. 5, 2024 for European Application No. 21767958.8.

(Continued)

*Primary Examiner* — Nicole A K Schmieder (57) ABSTRACT

Embodiments of the present application provide a text information processing method and apparatus, the method includes: acquiring a phoneme vector corresponding to an individual phoneme and a semantic vector corresponding to the individual phoneme in text information; acquiring first semantic information output at a last moment, wherein the first semantic information is semantic information corresponding to part of the text information in the text information, and the part of the text information is text information that has been converted into voice information; determining a context vector corresponding to a current moment according to the first semantic information, the phoneme vector corresponding to the individual phoneme and the semantic vector corresponding to the individual phoneme; and deter- (Continued)

---

S201 — Acquire a phoneme vector corresponding to an individual phoneme and a semantic vector corresponding to the individual phoneme in text informatio S202 — Acquire first semantic information output at a previous moment, where the first semantic information is semantic information corresponding to part of the text information in the text information, and the part of the text information is text information that has been converted into voice information S203 — Determine a context vector corresponding to the current moment according to the first semantic information, the phoneme vector corresponding to the individual phoneme and the semantic vector corresponding to the individual phoneme S204 — Determine voice information at the current moment according to the context vector and the first semantic information mining voice information at the current moment according to the context vector and the first semantic information.

16 Claims, 6 Drawing Sheets

(56) References Cited

U.S. PATENT DOCUMENTS

| | | | |
|---|---|---|---|
| 2015/0364128 A1 | 12/2015 | Zhao et al. | |
| 2018/0182151 A1 | 6/2018 | Liu et al. | |
| 2018/0190269 A1* | 7/2018 | Lokeswarappa | G09B 19/06 |
| 2019/0122651 A1* | 4/2019 | Arik | G10L 13/08 |
| 2020/0005763 A1 | 1/2020 | Chae et al. | |
| 2022/0020355 A1* | 1/2022 | Ming | G10L 13/06 |

FOREIGN PATENT DOCUMENTS

| | | |
|---|---|---|
| CN | 109036375 A | 12/2018 |
| CN | 109036377 A | 12/2018 |
| CN | 109285537 A | 1/2019 |
| CN | 109446333 A | 3/2019 |
| CN | 110136692 A | 8/2019 |
| CN | 110164463 A | 8/2019 |
| CN | 110534089 A | 12/2019 |
| CN | 110634466 A | 12/2019 |
| CN | 111785248 A | 10/2020 |
| JP | 2019-120841 A | 7/2019 |
| JP | 2020-34883 A | 3/2020 |
| WO | 2020/019885 A1 | 1/2020 |

OTHER PUBLICATIONS

Liumeng Xue et al. "Building a mixed-lingual neural TTS system with only monolingual data" Apr. 12, 2019, pp. 1-6.
International Search Report and written opinion dated Apr. 16, 2021 for PCT application No. PCT/CN2021/072016.
The Grant of Notice of patent right for invention for Chinese Patent Application No. 202010172575.7, dated Apr. 15, 2023.
The Extended European Search Report for European Patent Application No. 21767958.8, dated Apr. 18, 2023.
The Notice of Reasons for Refusal for Japanese Patent Application No. 2022-523879, dated Apr. 24, 2023.
Yuxuan Wang et al., "Tacotron: Towards End-To-End Speech Synthesis", arXiv;1703.10135v2, Apr. 6, 2017.
Jonathan Shen et al., "Natural TTS Synthesis by Conditioning Wavenet on MEL Spectrogram Predictions", 2018 IEEE, 2018.
Naihan Li et al., "Neural Speech Synthesis with Transformer Network", arXiv;1809.08895v3, Jan. 30, 2019.

* cited by examiner

TEXT INFORMATION PROCESSING METHOD AND APPARATUS

CROSS-REFERENCE TO RELATED APPLICATIONS

This application is a national stage of International Application No. PCT/CN2021/072016, filed on Jan. 15, 2021, which claims priority to a Chinese Patent Application No. 202010172575.7 filed with the China National Intellectual Property Administration on Mar. 12, 2020, entitled "TEXT INFORMATION PROCESSING METHOD AND APPARATUS", the entire content of both applications are hereby incorporated by reference in their entireties.

TECHNICAL FIELD

Embodiments of the present application relate to the field of computer technologies, and in particular, to a text information processing method and apparatus.

BACKGROUND

At present, voice corresponding to text information can be obtained by performing machine learning on the text information.

In related art, the process of performing machine learning on text information to obtain audio information includes: acquiring phoneme information corresponding to the text information, encoding the phoneme information to obtain semantic information, learning the semantic information to obtain a context vector, and then synthesizing voice according to the context vector.

SUMMARY

Embodiments of the present application provide a text information processing method and apparatus.

In a first aspect, an embodiment of the present application provides a text information processing method, including:
  acquiring a phoneme vector corresponding to an individual phoneme and a semantic vector corresponding to the individual phoneme in text information;
  acquiring first semantic information output at a previous moment, where the first semantic information is semantic information corresponding to part of the text information in the text information, and the part of the text information is text information that has been converted into voice information;
  determining a context vector corresponding to a current moment according to the first semantic information, the phoneme vector corresponding to the individual phoneme and the semantic vector corresponding to the individual phoneme; and
  determining voice information at the current moment according to the context vector and the first semantic information.

In a possible implementation manner, where determining the context vector corresponding to the current moment according to the first semantic information, the phoneme vector corresponding to the individual phoneme, and the semantic vector corresponding to the individual phoneme includes:
  determining a semantic matching degree according to the first semantic information and the semantic vector corresponding to the individual phoneme; and
  determining the context vector corresponding to the current moment according to the semantic matching degree, the phoneme vector corresponding to the individual phoneme, and the semantic vector corresponding to the individual phoneme.

In another possible implementation manner, where determining the semantic matching degree according to the first semantic information and the semantic vector corresponding to the individual phoneme includes:
  processing the first semantic information and the semantic vector corresponding to the individual phoneme by a first preset model to obtain the semantic matching degree, where the first preset model is obtained by learning multiple groups of first samples, and each group of first samples includes semantic information and semantic vectors.

In another possible implementation manner, where determining the context vector corresponding to the current moment according to the semantic matching degree, the phoneme vector corresponding to the individual phoneme and the semantic vector corresponding to the individual phoneme includes:
  determining a semantic context vector according to the semantic matching degree and the semantic vector corresponding to the individual phoneme;
  determining a phoneme context vector according to the semantic matching degree and the phoneme vector corresponding to the individual phoneme; and
  combining the semantic context vector and the phoneme context vector to determine the context vector corresponding to the current moment.

In another possible implementation manner, where determining the context vector corresponding to the current moment according to the first semantic information, the phoneme vector corresponding to the individual phoneme and the semantic vector corresponding to the individual phoneme includes:
  determining a resultant vector corresponding to the individual phoneme according to the phoneme vector corresponding to the individual phoneme and the semantic vector corresponding to the individual phoneme;
  determining the semantic matching degree according to the first semantic information and the resultant vector corresponding to the individual phoneme; and
  determining the context vector corresponding to the current moment according to the semantic matching degree and the resultant vector corresponding to the individual phoneme.

In another possible implementation manner, where determining the semantic matching degree according to the first semantic information and the resultant vector corresponding to the individual phoneme includes:
  processing the first semantic information and the resultant vector corresponding to the individual phoneme by a second preset model to obtain the semantic matching degree, where the second preset model is obtained by learning multiple groups of second samples, and each group of second samples includes semantic information and resultant vectors.

In another possible implementation manner, where determining the voice information at the current moment according to the context vector and the first semantic information includes:
  determining second semantic information corresponding to the current moment according to the context vector and the first semantic information; and performing Mel spectrum network mapping processing on the second semantic information to obtain the voice information at the current moment.

In another possible implementation manner, where acquiring the phoneme vector corresponding to the individual phoneme in the text information includes:
  acquiring a phoneme sequence of the text information, where the phoneme sequence includes at least one phoneme; and
  determining the phoneme vector corresponding to the individual phoneme according to the at least one phoneme.

In another possible implementation manner, where determining the phoneme vector corresponding to the individual phoneme according to the at least one phoneme includes:
  finding an identifier corresponding to the individual phoneme in a preset phoneme list; and
  searching for the phoneme vector corresponding to the individual phoneme in a preset phoneme lookup table according to the identifier corresponding to the individual phoneme.

In another possible implementation manner, where acquiring the semantic vector corresponding to the individual phoneme includes:
  encoding the phoneme vector corresponding to the individual phoneme to obtain the semantic vector corresponding to the individual phoneme.

In a second aspect, an embodiment of the present application provides a text information processing apparatus, including: a first acquiring module, a second acquiring module, a first determining module, and a second determining module, where,
  the first acquiring module is configured to acquire a phoneme vector corresponding to an individual phoneme and a semantic vector corresponding to the individual phoneme in text information;
  the second acquiring module is configured to acquire first semantic information output at a previous moment, where the first semantic information is semantic information corresponding to part of the text information in the text information, and the part of the text information is text information that has been converted into voice information;
  the first determining module is configured to determine a context vector corresponding to a current moment according to the first semantic information, the phoneme vector corresponding to the individual phoneme and the semantic vector corresponding to the individual phoneme;
  the second determining module is configured to determine voice information at the current moment according to the context vector and the first semantic information.

In a possible implementation manner, the first determining module is specifically configured to:
  determine a semantic matching degree according to the first semantic information and the semantic vector corresponding to the individual phoneme; and
  determine the context vector corresponding to the current moment according to the semantic matching degree, the phoneme vector corresponding to the individual phoneme, and the semantic vector corresponding to the individual phoneme.

In another possible implementation manner, the first determining module is specifically configured to:
  process the first semantic information and the semantic vector corresponding to the individual phoneme by a first preset model to obtain the semantic matching degree, where the first preset model is obtained by learning multiple groups of first samples, and each group of first samples includes semantic information and semantic vectors.

In another possible implementation manner, the first determining module is specifically configured to:
  determine a semantic context vector according to the semantic matching degree and the semantic vector corresponding to the individual phoneme;
  determine a phoneme context vector according to the semantic matching degree and the phoneme vector corresponding to the individual phoneme; and
  combine the semantic context vector and the phoneme context vector to determine the context vector corresponding to the current moment.

In another possible implementation manner, the first determining module is specifically configured to:
  determine a resultant vector corresponding to the individual phoneme according to the phoneme vector corresponding to the individual phoneme and the semantic vector corresponding to the individual phoneme;
  determine the semantic matching degree according to the first semantic information and the resultant vector corresponding to the individual phoneme; and determine the context vector corresponding to the current moment according to the semantic matching degree and the resultant vector corresponding to the individual phoneme.

In another possible implementation manner, the first determining module is specifically configured to:
  process the first semantic information and the resultant vector corresponding to the individual phoneme by a second preset model to obtain the semantic matching degree, where the second preset model is obtained by learning multiple groups of second samples, and each group of second samples includes semantic information and resultant vectors.

In another possible implementation manner, the second determining module is specifically configured to:
  determine second semantic information corresponding to the current moment according to the context vector and the first semantic information; and
  perform Mel spectrum network mapping processing on the second semantic information to obtain the voice information at the current moment.

In another possible implementation manner, the first acquiring module is specifically configured to:
  acquire a phoneme sequence of the text information, where the phoneme sequence includes at least one phoneme; and
  determine the phoneme vector corresponding to the individual phoneme according to the at least one phoneme.

In another possible implementation manner, the first acquiring module is specifically configured to:
  find an identifier corresponding to the individual phoneme in a preset phoneme list; and
  search for the phoneme vector corresponding to the individual phoneme in a preset phoneme lookup table according to the identifier corresponding to the individual phoneme.

In another possible implementation manner, the first acquiring module is specifically configured to:
  encode the phoneme vector corresponding to the individual phoneme to obtain the semantic vector corresponding to the individual phoneme.

In a third aspect, an embodiment of the present application provides a text information processing apparatus, including: at least one processor and a memory;

the memory stores instructions for execution by the computer;

the at least one processor executes the computer-executable instructions stored in the memory, causing the at least one processor to execute the text information processing method as shown in any one of the above first aspect.

In a fourth aspect, an embodiment of the present application provides a computer-readable storage medium, where computer-executable instructions are stored in the computer-readable storage medium, and when a processor executes the computer-executable instructions, the text information processing method in any one of the above first aspect is implemented.

In a fifth aspect, an embodiment of the present application provides a computer program product, where the computer program product can be executed by a processor, and when the computer program product is executed, the method according to any one of the first aspect is implemented.

In a sixth aspect, an embodiment of the present application provides a chip, including: a memory and a processor, where the memory stores a computer program, and the processor executes the computer program to execute the method according to any one of the first aspect.

Embodiments of the present application provide a text information processing method and apparatus, where the text information processing method includes: acquiring a phoneme vector corresponding to an individual phoneme and a semantic vector corresponding to the individual phoneme in text information; acquiring first semantic information output at a previous moment, where the first semantic information is semantic information corresponding to part of the text information in the text information, and the part of the text information is text information that has been converted into voice information; determining a context vector corresponding to a current moment according to the first semantic information, the phoneme vector corresponding to the individual phoneme and the semantic vector corresponding to the individual phoneme; and determining voice information at the current moment according to the context vector and the first semantic information.

BRIEF DESCRIPTION OF DRAWINGS

In order to more clearly illustrate the embodiments of the present application or the technical solutions in the related art, in the following, the accompanying drawings used in the description of the embodiments or the related art will be briefly introduced. Obviously, the accompanying drawings in the following description are some embodiments of the present application, and for those of ordinary skill in the art, other drawings can also be obtained from these drawings without paying any creative effort.

DESCRIPTION OF EMBODIMENTS

To make the objectives, technical solutions, and advantages of embodiments of the present application clearer, in the following, the technical solutions in embodiments of the present application are clearly and comprehensively described with reference to the accompanying drawings in the embodiments of the present application. Apparently, the described embodiments are merely a part rather than all embodiments of the present application. All other embodiments obtained by persons of ordinary skill in the art based on embodiments of the present application without paying creative effort shall fall within the protection scope of the present application.

The terms "first", "second", "third" and "fourth", etc. (if any) in the description and/or claims of the present application and the above-mentioned drawings are used to distinguish similar objects, while it is not necessary to describe a particular order or sequence. It should be understood that the data so used may be interchanged under appropriate circumstances such that the embodiments of the application described herein can, for example, be practiced in sequences other than those illustrated or described herein. Furthermore, the terms "including" and "having", and any variations thereof, are intended to cover non-exclusive inclusion, for example, processes, methods, systems, products or apparatuses including a series of steps or units are not necessarily limited to those expressly listed, rather, those steps or units may include other steps or units not expressly listed or inherent to these processes, methods, products or apparatuses.

Figure 1:
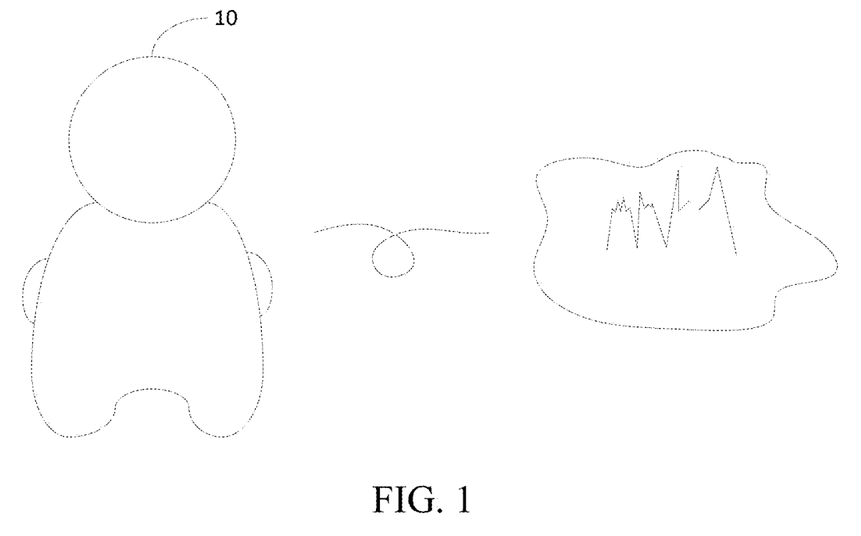
FIG. 1 is a schematic diagram of an application scenario of a text information processing method provided by the application.

FIG. 1 is a schematic diagram of an application scenario of a text information processing method provided by the application. Please refer to FIG. 1, including: a smart device 10, the smart device 10 can receive text information, and synthesize the text information into voice audio. For example, the smart device 10 may be a smart phone, a smart robot, a smart reader, and other devices that can synthesize voice audio according to text information.

In related art, the process of performing machine learning on text information to obtain audio information includes: acquiring phoneme information corresponding to the text information, encoding the phoneme information to obtain semantic information, learning the semantic information to obtain a context vector, and then synthesizing voice according to the context vector. In the above process, in the process of learning the semantic information to obtain the context vector, the obtained context vector is inaccurate, resulting in poor sound quality of the synthesized voice.

In the present application, the process of synthesizing voice audio according to text information includes: determining a context vector corresponding to a current moment according to a phoneme vector and a semantic vector corresponding to an individual phoneme in text information, and then determining voice information at the current moment according to the context vector corresponding to the current moment. In the above process, the context vector corresponding to the current moment is determined according to the phoneme vector and the semantic vector corresponding to the individual phoneme, therefore, an accurate context vector can be obtained, thus improving the accuracy of the determined voice information, and further enabling the voice audio synthesized according to the voice information to have a better rhythm and a more stable sound quality.

Hereinafter, the technical solutions shown in the present application will be described in detail through specific embodiments. It should be noted that the following specific embodiments may be combined with each other, and the same or similar content will not be repeated in different embodiments.

Figure 2:
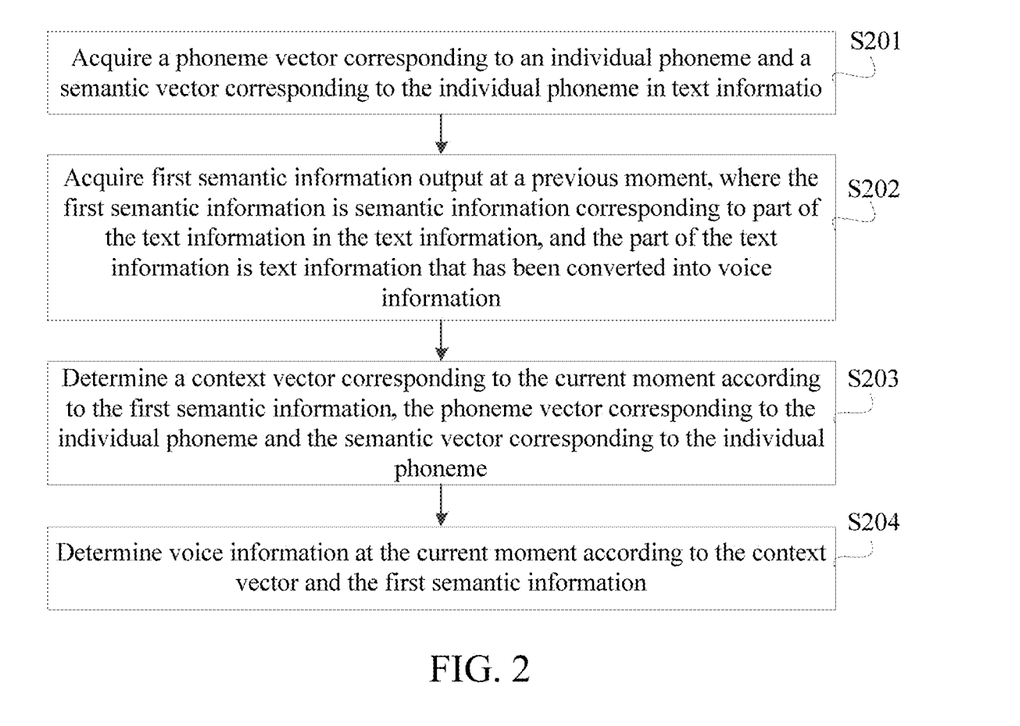
FIG. 2 is a schematic flowchart of a text information processing method provided by the present application.

S201: acquire a phoneme vector corresponding to an individual phoneme and a semantic vector corresponding to the individual phoneme in text information.

In an implementation, the execution subject body of the text information processing method shown in the present application is a smart device, or can be a text information processing apparatus provided in the smart device, and the text processing apparatus can be implemented by a combination of software and/or hardware.

In a possible implementation manner, it is possible to acquire a phoneme sequence of the text information, the phoneme sequence including at least one phoneme; and determine a phoneme vector corresponding to an individual phoneme according to the at least one phoneme. For example, the text information is "Wǒ Zài Shan Xī (I am in Shaanxi)", and the phoneme sequence is w, o3, z, ai4, sh, an3, x, i1.

Further, it is possible to obtain the phoneme vector corresponding to the individual phoneme from a preset data table, where the preset data table includes at least one phoneme and a phoneme vector corresponding to an individual phoneme.

In the present application, encode the phoneme vector corresponding to the individual phoneme by a preset encoder to obtain the semantic vector corresponding to the individual phoneme. In an implementation, the preset encoder is the same as an Encoder (Encoder) model in an Encoder (Encoder)-Decoder (Decoder) model.

S202: acquire first semantic information output at a previous moment, where the first semantic information is semantic information corresponding to part of the text information in the text information, and the part of the text information is text information that has been converted into voice information.

Specifically, the first semantic information output at the previous moment is output information (i.e., the hidden layer state vector) of the preset decoder at the previous moment. In an implementation, the preset decoder is the same as the decoder (Decoder) model in the encoder (Encoder)-decoder (Decoder) model.

S203: determine a context vector corresponding to the current moment according to the first semantic information, the phoneme vector corresponding to the individual phoneme and the semantic vector corresponding to the individual phoneme.

Specifically, it is possible to process the first semantic information and the semantic vector corresponding to the individual phoneme by a first preset model to obtain a semantic matching degree, and then determine the context vector corresponding to the current moment according to the semantic matching degree, the phoneme vector corresponding to the individual phoneme and the semantic vector corresponding to the individual phoneme; or, it is possible to process a resultant vector between the first semantic information and the semantic vector and the phoneme vector corresponding to the individual phoneme by a second preset model to obtain the semantic matching degree, and then determine the context vector corresponding to the current moment according to the semantic matching degree and the semantic vector corresponding to the individual phoneme.

Figure 3:
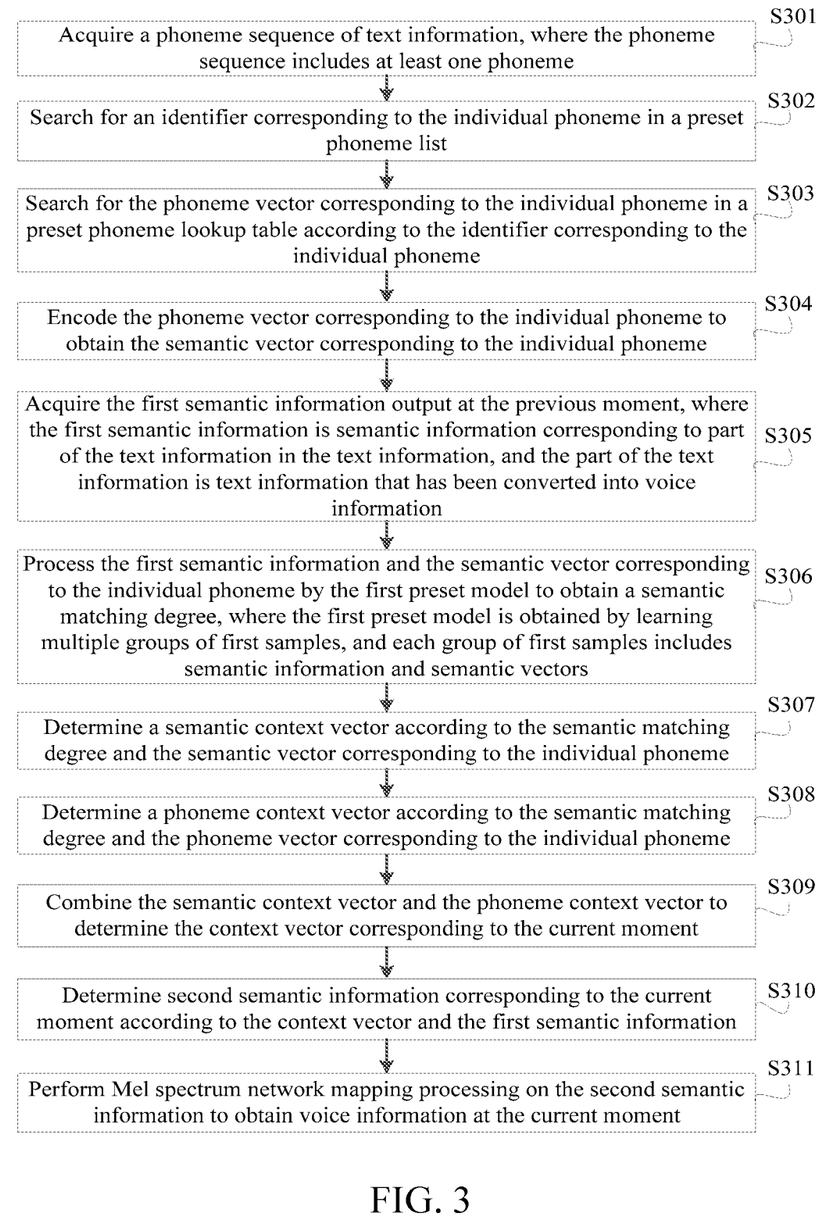
FIG. 3 is a schematic flowchart of a text information processing method provided by the present application.
Figure 5:
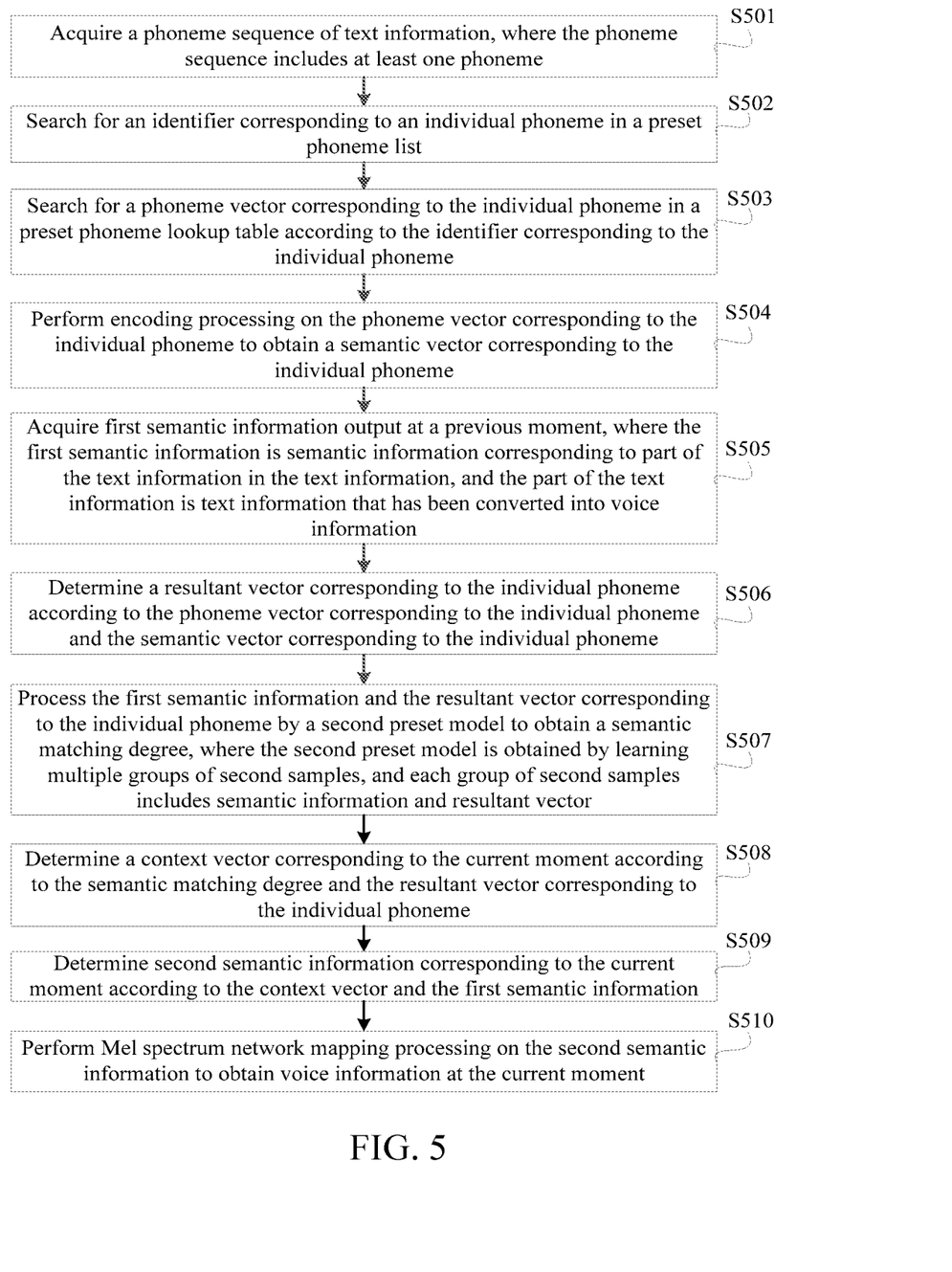
FIG. 5 is a schematic flowchart of another text information processing method provided by the present application.

It should be noted that, for a detailed description of the first preset model, please refer to the embodiment in FIG. 3, and for a detailed description of the second model, please refer to the embodiment in FIG. 5.

S204: determine voice information at the current moment according to the context vector and the first semantic information.

Specifically, it is possible to process the context vector and the first semantic information by a preset decoder to obtain second semantic information at the current moment, and then determine the voice information at the current moment according to the second semantic information, where the voice information at the current moment is a Mel spectrum corresponding to the current moment.

The text information processing method provided by the embodiment of the present application includes: acquiring a phoneme vector corresponding to an individual phoneme and a semantic vector corresponding to the individual phoneme in text information; acquiring first semantic information output at a previous moment, where the first semantic information is semantic information corresponding to part of the text information in the text information, and the part of the text information is text information that has been converted into voice information; determining a context vector corresponding to a current moment according to the first semantic information, the phoneme vector corresponding to the individual phoneme and the semantic vector corresponding to the individual phoneme; and determining voice information at the current moment according to the context vector and the first semantic information. In the above method, the context vector corresponding to the current moment is determined according to the first semantic information, the phoneme vector corresponding to the individual phoneme and the semantic vector corresponding to the individual phoneme, so that the determined context vector is more accurate, thereby improving the accuracy of the determined voice information, thus enabling voice audio synthesized according to the voice information to have a better rhythm and a more stable sound quality.

On the basis of the above embodiments, the text information processing method provided by the present application will be further described below with reference to the embodiment of FIG. 3. For details, please refer to FIG. 3.

FIG. 3 is a schematic flowchart of a text information processing method provided by the present application. As shown in FIG. 3, the text information processing method includes:

S301: acquire a phoneme sequence of text information, where the phoneme sequence includes at least one phoneme.

Specifically, it is possible to obtain the phoneme sequence of the text information by performing phoneme conversion processing on the text information.

For example, if the text information is "Wǒ ài Zhōng Guó (I love China)", after the phoneme conversion processing is performed on "Wo Ai Zhong Guo", the obtained phoneme sequence is w, o3, ai4, zh, ong1, g, uo2. Among them, w, o3, ai4, zh, ong1, g, uo2 are all phonemes.

S302: search for an identifier corresponding to the individual phoneme in a preset phoneme list.

Specifically, the preset phoneme list includes at least one phoneme and an identifier corresponding to the individual phoneme, where the identifier corresponding to the individual phoneme may be a preset number or an index number.

For example, when the identifier corresponding to the individual phoneme is a preset number, if the phoneme sequence is w, o3, ai4, zh, ong1, g, uo2, the identifiers corresponding to the phonemes in the above phoneme sequence are found in the preset phoneme list, which are 53, 22, 11, 66, 39, 28, 42.

S303: search for the phoneme vector corresponding to the individual phoneme in a preset phoneme lookup table according to the identifier corresponding to the individual phoneme.

Specifically, the preset phoneme lookup table is a two-dimensional lookup table obtained through joint training of a neural network, and the dimension of the two-dimensional lookup table is $T_p \times D_P$, $T_p$ represents the total number of phonemes included in the preset phoneme lookup table, $D_P$ represents the depth of the phoneme vector in the preset phoneme lookup table.

Further, search for the phoneme vector corresponding to the individual phoneme in the preset phoneme look-up table according to the identifier corresponding to the individual phoneme, where the found phoneme vectors corresponding to all the phonemes can form a two-dimensional table. The dimension of the two-dimensional table is $T_j \times D_P$, where $T_j$ is the number of phonemes included in the phoneme sequence.

S304: encode the phoneme vector corresponding to the individual phoneme to obtain the semantic vector corresponding to the individual phoneme.

Specifically, encode the phoneme vector corresponding to the individual phoneme by a preset encoder to obtain the semantic vector corresponding to the individual phoneme. For a detailed description of the preset encoder, please refer to the embodiment in FIG. 4.

S305: acquire the first semantic information output at the previous moment, where the first semantic information is semantic information corresponding to part of the text information in the text information, and the part of the text information is text information that has been converted into voice information.

Specifically, the execution manner of S305 is the same as the execution manner of S202, and the execution process of S305 is not repeated here.

S306: process the first semantic information and the semantic vector corresponding to the individual phoneme by the first preset model to obtain a semantic matching degree, where the first preset model is obtained by learning multiple groups of first samples, and each group of first samples includes semantic information and semantic vectors.

The first preset model has a representation form of the following formula 1. Specifically, it is possible to process the first semantic information and the semantic vector corresponding to the individual phoneme by formula 1 to obtain the semantic matching degree corresponding to the current moment t:

$$e_{tj} = \text{attention}(s_{t-1}, h_j) \qquad \text{Formula 1}$$

In the formula, $e_{tj}$ is the semantic matching degree corresponding to the moment t, the semantic matching degree is used to measure a matching degree between voice information at the moment t and the j-th phoneme, and $S_{t-1}$ is a hidden layer state of the preset decoder at the moment t−1 (that is, the first semantic information), $h_j$ is the semantic vector corresponding to the j-th phoneme.

S307: determine a semantic context vector according to the semantic matching degree and the semantic vector corresponding to the individual phoneme.

In an implementation, it is possible to process the semantic matching degree by the following formula 2 to obtain an alignment matching degree, and then process the semantic alignment degree and the semantic vector corresponding to the individual phoneme by the following formula 3 to obtain the semantic context vector.

In an implementation, the formula 2 has the following form:

$$a_{tj} = \frac{e_{tj}}{\sum_{j=1}^{T_j} e_{tj}} \qquad \text{Formula 2}$$

In the formula, $a_{tj}$ represents the semantic alignment degree, and the semantic alignment degree is used to measure the matching degree between the phoneme corresponding to the moment t and voice audio.

It should be noted that the above semantic alignment degree $a_{ij}$ needs to meet the following condition:

$$\sum_{j=1}^{T_j} a_{tj} = 1.$$

In an implementation, the formula 3 has the following form:

$$c_t = \sum_{j=1}^{T_j} \alpha_{tj} h_j \qquad \text{Formula 3}$$

In the formula, $c_t$ is the semantic context vector corresponding to the moment t.

S308: determine a phoneme context vector according to the semantic matching degree and the phoneme vector corresponding to the individual phoneme.

In an implementation, it is possible to process the semantic matching degree by the above formula 2 to obtain the semantic alignment degree, and then process the semantic alignment degree and the phoneme vector corresponding to the individual phoneme by the following formula 4 to obtain the phoneme context vector.

In an implementation, the formula 4 has the following form:

$$c'_t = \sum_{j=1}^{T_j} \alpha_{tj} p_j \qquad \text{Formula 4}$$

In the formula, $c'_t$ is the phoneme context vector corresponding to the moment t, and $p_j$ is the phoneme vector corresponding to the j-th phoneme.

S309: combine the semantic context vector and the phoneme context vector to determine the context vector corresponding to the current moment.

In an implementation, it is possible to combine the semantic context vector and the phoneme context vector by the following formula 5 to determine the context vector corresponding to the current moment.

In an implementation, the formula 5 has the following form:

$$C_t=[c_t;\acute{c}_t] \quad \text{Formula 5}$$

$C_t$ is the context vector corresponding to the moment t.

It should be noted that the semantic context vector $C_t$ and the phoneme context vector $\acute{C}_t$ have the same depth, and the depth of the context vector $C_t$ is twice the depth of the semantic context vector $C_t$ (or the phoneme context vector $\acute{C}_t$).

S310: determine second semantic information corresponding to the current moment according to the context vector and the first semantic information.

Specifically, decode the context vector and the first semantic information by a preset decoder to obtain the second semantic information corresponding to the current moment. Among them, the second semantic information is a hidden layer state vector of the preset decoder at the current moment.

S311: perform Mel spectrum network mapping processing on the second semantic information to obtain voice information at the current moment.

Further, execute the above-mentioned S305 to S311 iteratively, then obtain voice audio corresponding to the text information according to voice synthesis processing of the voice information at all moments through a preset voice synthesizer. Among them, the preset voice synthesizer may be a WaveNet voice synthesizer, or may be other voice synthesizers.

Different from the related art, in the related art, in the process of learning the context vector according to the semantic vector of the individual phoneme through a gradient reverse return method, calculation errors will be introduced, thus rendering the context vector obtained inaccurate, thereby affecting the quality of the voice audio.

By contrast, the text information processing method shown in the present application includes: acquiring a semantic context vector according to a semantic matching degree and the semantic vector corresponding to the individual phoneme; acquiring a phoneme context vector related to the phoneme according to the semantic matching degree and the phoneme vector corresponding to the individual phoneme; and combining the semantic context vector and the phoneme context vector to obtain the context vector corresponding to the current moment. In the process of determining the context vector corresponding to the current moment, reference is made to the phoneme vector and the voice vector corresponding to the individual phoneme, thus improving the accuracy of the determined context vector corresponding to the current moment.

Figure 4:
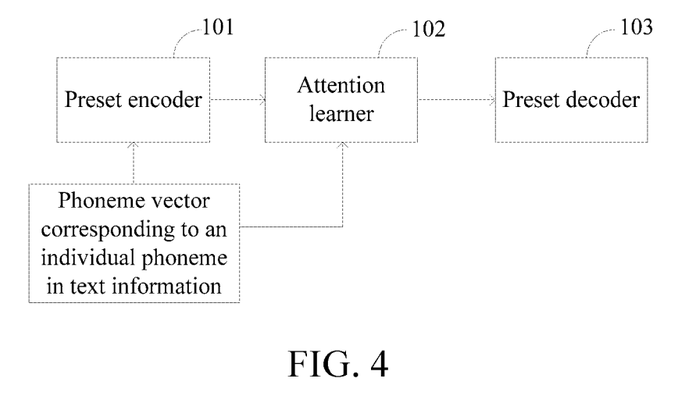
FIG. 4 is a schematic diagram of a processing structure of a text information processing method provided by the present application.

FIG. 4 is a schematic diagram of a processing structure of a text information processing method provided by the present application. As shown in FIG. 4, the processing structure includes: a preset encoder 101, an attention learner 102 and a preset decoder 103. The attention learner 102 includes a first preset model, and the attention learner 102 is respectively connected with the preset encoder 101 and the preset decoder 103.

In practical applications, the preset encoder 101 executes the method shown in S304 in the embodiment of FIG. 3 to obtain a semantic vector corresponding to an individual phoneme, and provides the semantic vector corresponding to the individual phoneme to the attention learner 102. The attention learner 102 executes the method shown in S305 in the embodiment of FIG. 3 to obtain first semantic information output by the preset decoder 103 at the previous moment, and executes the method shown in S306 to S309 in sequence according to the first semantic information, the phoneme vector and the semantic vector corresponding to the individual phoneme to obtain the context vector corresponding to the current moment, and provides the decoder preset 103 with the context vector corresponding to the current moment. The preset decoder 103 may execute the method shown in S310 to obtain the second semantic information corresponding to the current moment.

In the related art, the semantic vector corresponding to the individual phoneme obtained after the encoder encodes the phoneme vector corresponding to the individual phoneme has information loss. Therefore, since the context vector at the current moment is determined only according to the semantic vector corresponding to the individual phoneme, the context vector at the current moment cannot be accurately determined, thus rendering the determined voice information inaccurate, and further making the voice audio synthesized according to the voice information have a poor rhythm and a poor sound quality stability.

While in the present application, in the processing structure shown in FIG. 4, the attention learner 102 can learn the phoneme vector corresponding to the individual phoneme in the text information and the semantic vector corresponding to the individual phoneme output by the preset encoder 101 to obtain the semantic matching degree, the semantic alignment degree and the context vector of the current moment in turn, thus making the determined context vector more accurate, thereby improving the accuracy of the determined voice information, and enabling the voice audio synthesized according to the voice information to have a better rhythm and a more stable sound quality.

On the basis of the foregoing embodiment, the text information processing method provided by the present application will be further described below with reference to the embodiment of FIG. 5. For details, please refer to FIG. 5.

FIG. 5 is a schematic flowchart of another text information processing method provided by the present application. As shown in FIG. 5, the text information processing method includes:

S501: acquire a phoneme sequence of text information, where the phoneme sequence includes at least one phoneme;

S502: search for an identifier corresponding to an individual phoneme in a preset phoneme list;

S503: search for a phoneme vector corresponding to the individual phoneme in a preset phoneme lookup table according to the identifier corresponding to the individual phoneme;

S504: perform encoding processing on the phoneme vector corresponding to the individual phoneme to obtain a semantic vector corresponding to the individual phoneme;

S505: acquire first semantic information output at a previous moment, where the first semantic information is semantic information corresponding to part of the text information in the text information, and the part of the text information is text information that has been converted into voice information.

Specifically, the execution manners of S501 to S505 are the same as the execution manners of S401 to S405, and the execution processes of S501 to S505 are not repeated here.

S506: determine a resultant vector corresponding to the individual phoneme according to the phoneme vector corresponding to the individual phoneme and the semantic vector corresponding to the individual phoneme.

In an implementation, it is possible to process the phoneme vector corresponding to the individual phoneme and the semantic vector corresponding to the individual phoneme by the following formula 6 to obtain the resultant vector corresponding to the individual phoneme:

$$m_j = h_j + p_j \qquad \text{Formula 6}$$

In the formula, $m_j$ is the resultant vector corresponding to the j-th phoneme.

S507: process the first semantic information and the resultant vector corresponding to the individual phoneme by a second preset model to obtain a semantic matching degree, where the second preset model is obtained by learning multiple groups of second samples, and each group of second samples includes semantic information and resultant vectors.

It should be noted that the second preset model may be the same as or different from the first preset model.

For example, when the second preset model is the same as the first preset model, the semantic vector $h_j$ corresponding to the j-th phoneme in the formula 1 can be replaced with the resultant vector $m_j$ corresponding to the j-th phoneme, and then the semantic matching degree is determined according to the formula 1.

S508: determine a context vector corresponding to the current moment according to the semantic matching degree and the resultant vector corresponding to the individual phoneme.

Specifically, it is possible to process the semantic matching degree by the above formula 2 to obtain the semantic alignment degree $a_{tj}$, and process the semantic matching degree and the resultant vector corresponding to the individual phoneme by the following formula 7 to obtain the context vector $C_t$ corresponding to the current moment:

$$C_t = \sum_{j=1}^{T_j} \alpha_{tj} m_j \qquad \text{Formula 7}$$

S509: determine second semantic information corresponding to the current moment according to the context vector and the first semantic information.

S510: perform Mel spectrum network mapping processing on the second semantic information to obtain voice information at the current moment.

Specifically, the execution manners of S509 and S510 are the same as the execution manners of S310 and S311, and the execution processes of S509 and S510 are not repeated here.

It should be noted that, repeat S505 to S510 to obtain the voice information at all moments, and then perform voice synthesis processing on the voice information at all moments by a preset voice synthesizer to obtain the voice audio corresponding to the text information, where all moments are determined by the preset decoder during the self-learning process. The preset voice synthesizer may be a WaveNet voice synthesizer, or may be other voice synthesizers.

Different from the related art, in the related art, the semantic matching degree $e_{tj}$ is usually determined only according to the semantic vector $h_j$, and then the semantic alignment degree $a_{tj}$ is determined according to the semantic matching degree $e_{tj}$, thus resulting in an inaccurate semantic alignment degree $a_{tj}$. In the present application, the semantic matching degree $e_{tj}$ is determined according to the resultant vector of the semantic vector $h_j$ and the phoneme vector $p_j$, and then the semantic alignment degree $a_{tj}$ is determined according to the semantic matching degree $e_{tj}$, thus improving the accuracy of the semantic alignment degree $a_{tj}$, thereby improving the accuracy of the determined context vector $C_t$.

Figure 6:
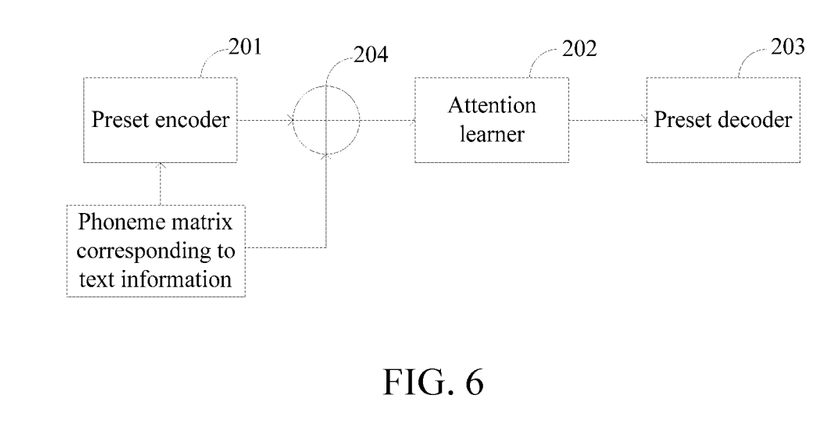
FIG. 6 is a schematic diagram of a processing structure of another text information processing method provided by the present application.

FIG. 6 is a schematic diagram of a processing structure of another text information processing method provided by the present application. As shown in FIG. 6, the processing structure includes: a preset encoder 201, an attention learner 202, a preset decoder 203 and an adder 204. The attention learner 202 includes a second preset model, the attention learner 202 is connected with the adder 204 and the preset decoder 203 respectively, and the preset encoder 201 is connected with the adder 204.

It should be noted that the phoneme matrix corresponding to the text information is a combination matrix of phoneme vectors corresponding to the phonemes in the text information.

In practical applications, the preset encoder 201 executes the method shown in S504 in the embodiment of FIG. 5 to obtain a semantic vector corresponding to the individual phoneme, and provides the semantic vector corresponding to the individual phoneme to the attention learner 202. The attention learner 202 executes the method shown in S505 in the embodiment of FIG. 5 to obtain the first semantic information of the preset decoder 203 at the previous moment, and executes the methods shown in S506 to S508 sequentially according to the first semantic information, the phoneme vector and the semantic vector corresponding to the individual phoneme to obtain the context vector corresponding to the current moment, and provides the preset decoder 203 with the context vector corresponding to the current moment. The preset decoder 203 executes the method shown in S509 to obtain the second semantic information corresponding to the current moment.

In the processing structure shown in FIG. 6, the adder 204 superimposes the semantic vector and the phoneme vector corresponding to the individual phoneme to obtain the resultant vector corresponding to the individual phoneme, thus making up for the information loss in the semantic vector corresponding to the individual phoneme obtained after the encoder encodes the phoneme vector corresponding to the individual phoneme in the related art, thereby improving the accuracy of the determined semantic matching degree, the semantic alignment degree and the context vector at the current moment, and further improving the accuracy of the determined voice information, so that the voice audio synthesized according to the voice information has a better rhythm and a more stable sound quality.

Figure 7:
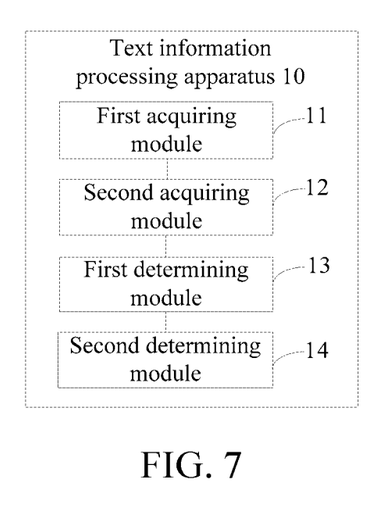
FIG. 7 is a schematic structural diagram of a text information processing apparatus provided by the present application.

FIG. 7 is a schematic structural diagram of a text information processing apparatus provided by the present application. The text information processing apparatus 10 can be set in a smart device. As shown in FIG. 7, the text information processing apparatus 10 includes: a first acquiring module 11, a second acquiring module 12, a first determining module 13 and a second determining module 14, where, the first acquiring module 11 is configured to acquire a phoneme vector corresponding to an individual phoneme and a semantic vector corresponding to the individual phoneme in text information;

the second acquiring module 12 is configured to acquire first semantic information output at a previous moment, where the first semantic information is semantic information corresponding to part of the text information in the text information, and the part of the text information is text information that has been converted into voice information;

the first determining module 13 is used to determine a context vector corresponding to a current moment according to the first semantic information, the phoneme vector corresponding to the individual phoneme and the semantic vector corresponding to the individual phoneme;

the second determining module 14 is configured to determine voice information at the current moment according to the context vector and the first semantic information.

The text information processing apparatus 10 provided in the embodiments of the present application can execute the technical solutions shown in the foregoing method embodiments, and the implementation principles and beneficial effects thereof are similar, which will not be repeated here.

In a possible implementation manner, the first determining module 13 is specifically configured to:

determine a semantic matching degree according to the first semantic information and the semantic vector corresponding to the individual phoneme; and determine the context vector corresponding to the current moment according to the semantic matching degree, the phoneme vector corresponding to the individual phoneme, and the semantic vector corresponding to the individual phoneme.

In another possible implementation manner, the first determining module 13 is specifically configured to:

process the first semantic information and the semantic vector corresponding to the individual phoneme by a first preset model to obtain the semantic matching degree, where the first preset model is obtained by learning multiple groups of first samples, and each group of first samples includes semantic information and semantic vectors.

In another possible implementation manner, the first determining module 13 is specifically configured to:

determine a semantic context vector according to the semantic matching degree and the semantic vector corresponding to the individual phoneme;

determine a phoneme context vector according to the semantic matching degree and the phoneme vector corresponding to the individual phoneme; and combine the semantic context vector and the phoneme context vector to determine the context vector corresponding to the current moment.

In another possible implementation manner, the first determining module 13 is specifically configured to:

determine a resultant vector corresponding to the individual phoneme according to the phoneme vector corresponding to the individual phoneme and the semantic vector corresponding to the individual phoneme;

determine the semantic matching degree according to the first semantic information and the resultant vector corresponding to the individual phoneme; and determine the context vector corresponding to the current moment according to the semantic matching degree and the resultant vector corresponding to the individual phoneme.

In another possible implementation manner, the first determining module 13 is specifically configured to:

process the first semantic information and the resultant vector corresponding to the individual phoneme by a second preset model to obtain the semantic matching degree, where the second preset model is obtained by learning multiple groups of second samples, and each group of second samples includes semantic information and resultant vectors.

In another possible implementation manner, the second determining module 14 is specifically configured to:

determine second semantic information corresponding to the current moment according to the context vector and the first semantic information; and perform Mel spectrum network mapping processing on the second semantic information to obtain the voice information at the current moment.

In another possible implementation manner, the first acquiring module 11 is specifically configured to:

acquire a phoneme sequence of the text information, where the phoneme sequence includes at least one phoneme; and determine the phoneme vector corresponding to the individual phoneme according to the at least one phoneme.

In another possible implementation manner, the first acquiring module 11 is specifically configured to:

find an identifier corresponding to the individual phoneme in a preset phoneme list; and search for the phoneme vector corresponding to the individual phoneme in a preset phoneme lookup table according to the identifier corresponding to the individual phoneme.

In another possible implementation manner, the first acquiring module 11 is specifically configured to:

encode the phoneme vector corresponding to the individual phoneme to obtain the semantic vector corresponding to the individual phoneme.

The text information processing apparatus 10 provided in the embodiments of the present application can execute the technical solutions shown in the foregoing method embodiments, and the implementation principles and beneficial effects thereof are similar, which will not be repeated here.

Figure 8:
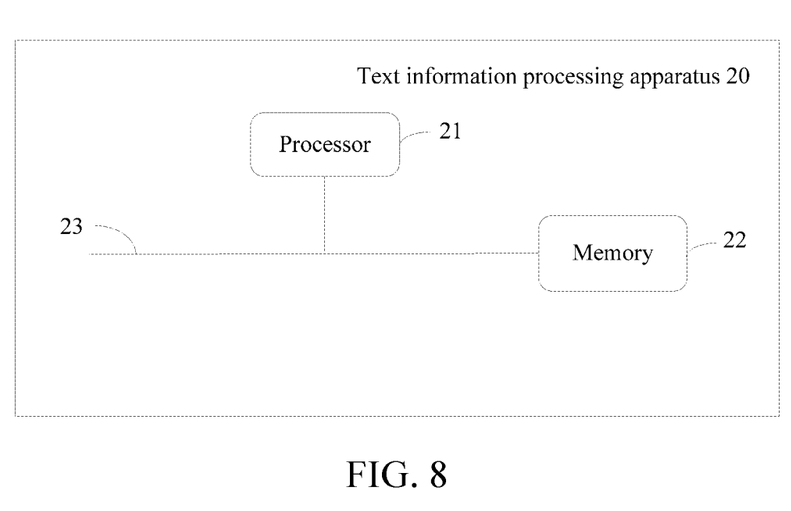
FIG. 8 is a schematic diagram of a hardware structure of a text information processing apparatus provided by the present application.

FIG. 8 is a schematic diagram of a hardware structure of a text information processing apparatus provided by the present application. The text information processing apparatus 20 may be provided in a smart device. As shown in FIG. 8, the text information processing apparatus 20 includes: at least one processor 21 and a memory 22. The processor 21 and the memory 22 are connected through a bus 23.

In a specific implementation process, the at least one processor 21 executes computer-executed instructions stored in the memory 22, so that the at least one processor 21 executes the above text information processing method.

For the specific implementation process of the processor 21, reference may be made to the foregoing method embodiments, and the implementation principles and technical effects thereof are similar, and details are not described herein again in this embodiment.

In the above embodiment shown in FIG. 8, it should be understood that the processor may be a central processing unit (CPU), or other general-purpose processors, digital signal processors (DSP), application specific integrated circuits (ASIC) and so on. The general purpose processor may be a microprocessor or the processor may be any conventional processor or the like. The steps of the method disclosed in conjunction with the application can be directly embodied as being executed by a hardware processor, or executed by a combination of hardware and software modules in the processor.

The memory may include a high-speed RAM memory, and may also include a non-volatile storage NVM, such as at least one disk memory.

The bus may be an industry standard architecture (ISA) bus, a peripheral component (PCI) bus or an extended industry standard architecture (EISA) bus, or the like. The bus can be divided into an address bus, a data bus, a control bus and so on. For convenience of representation, the buses in the drawings of the present application are not limited to only one bus or one type of bus.

The present application provides a computer-readable storage medium, where computer-executable instructions are stored in the computer-readable storage medium, and when the processor executes the computer-executable instructions, the above text information processing method is implemented.

The present application further provides a computer program product, where the computer program product can be executed by a processor, and when the computer program product is executed, the method according to any one of the method embodiments is implemented.

The present application further provides a chip, including: a memory and a processor, where the memory stores a computer program, and the processor executes the computer program to execute the method according to any one of the method embodiments.

The above-mentioned computer-readable storage medium can be realized by any type of volatile or non-volatile storage devices or their combination, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk. A readable storage medium can be any available medium that can be accessed by a general purpose or special purpose computer.

An exemplary readable storage medium is coupled to a processor such that the processor can read information from, and write information to, the readable storage medium. Of course, the readable storage medium can also be an integral part of the processor. The processor and the readable storage medium may be located in application specific integrated circuits (ASIC). Of course, the processor and the readable storage medium may also exist in the apparatus as discrete components.

The division of units is only a logical function division, and other division methods may be used in actual implementations. For example, multiple units or components may be combined or integrated into another system, or some features may be ignored or not implemented. On the other hand, the shown or discussed mutual coupling or direct coupling or communicational connections may be indirect coupling or communicational connections through some interfaces, apparatuses or units, and may be in electrical, mechanical or other forms.

Units described as separate components may or may not be physically separated, and components shown as units may or may not be physical units, that is, may be located in one place, or may be distributed to multiple network units. Some or all of the units may be selected according to actual needs to achieve the purpose of the solution in the embodiments.

In addition, the functional units in the embodiments of the present application may be integrated into one processing unit, or the units may exist physically alone, or two or more units may be integrated into one unit.

The functions, if implemented in the form of software functional units and sold or used as stand-alone products, may be stored in a computer-readable storage medium. Based on such understanding, the technical solution of the present application in essence or the part that contributes to the related art or the part of the technical solution can be embodied in the form of a software product. The computer software product is stored in a storage medium, including several instructions which are used to cause a computer device (which may be a personal computer, a server or a network device, etc.) to execute all or part of the steps of the methods in various embodiments of the present application. The aforementioned storage medium includes: a U disk, a mobile hard disk, a read-only memory (ROM), a random access memory (RAM), a magnetic disk or an optical disk and other mediums that can store program codes.

Those of ordinary skill in the art can understand that all or part of the steps for implementing the above method embodiments may be completed by program instructions related to hardware. The aforementioned program can be stored in a computer-readable storage medium. When the program is executed, the steps including the above method embodiments are executed; and the foregoing storage medium includes: an ROM, an RAM, a magnetic disk or an optical disk and other mediums that can store program codes.

Finally, it should be noted that the above embodiments are only used to illustrate the technical solutions of the present application, but not to limit them; although the present application has been described in detail with reference to the foregoing embodiments, those of ordinary skill in the art should understand that: the technical solutions described in the foregoing embodiments can still be modified, or equivalent replacements can be made to some or all of the technical features thereof; and these modifications or replacements do not make the essence of the corresponding technical solutions deviate from the scope of the technical solutions of the embodiments of the present application.

The invention claimed is:

1. A text information processing method, wherein the method is applied in a smart device that synthesizes voice audio according to text information and is implemented by a processor of a text information processing apparatus in the smart device, the method comprising:
   acquiring a phoneme vector corresponding to an individual phoneme and a semantic vector corresponding to the individual phoneme in the text information;
   acquiring first semantic information output at a previous moment, wherein the first semantic information is semantic information corresponding to part of the text information in the text information, and the part of the text information is text information that has been converted into voice information;
   processing the first semantic information and the semantic vector corresponding to the individual phoneme by a first preset model to obtain a semantic matching degree, wherein the first preset model is obtained by learning multiple groups of first samples, and each group of the multiple groups of first samples includes learning semantic information and learning semantic vectors;
   determining a semantic context vector according to the semantic matching degree and the semantic vector corresponding to the individual phoneme;
   determining a phoneme context vector according to the semantic matching degree and the phoneme vector corresponding to the individual phoneme;
   combining the semantic context vector and the phoneme context vector to determine a context vector corresponding to a current moment;
   determining voice information at the current moment according to the context vector and the first semantic information; and performing voice synthesis processing on voice information at all moments to obtain voice audio corresponding to the text information.

2. The method according to claim 1, wherein determining the voice information at the current moment according to the context vector and the first semantic information comprises:
   determining second semantic information corresponding to the current moment according to the context vector and the first semantic information; and
   performing Mel spectrum network mapping processing on the second semantic information to obtain the voice information at the current moment.

3. The method according to claim 1, wherein acquiring the phoneme vector corresponding to the individual phoneme in the text information comprises:
   acquiring a phoneme sequence of the text information, wherein the phoneme sequence includes at least one phoneme; and
   determining the phoneme vector corresponding to the individual phoneme according to the at least one phoneme.

4. The method according to claim 3, wherein determining the phoneme vector corresponding to the individual phoneme according to the at least one phoneme comprises:
   finding an identifier corresponding to the individual phoneme in a preset phoneme list; and
   searching for the phoneme vector corresponding to the individual phoneme in a preset phoneme lookup table according to the identifier corresponding to the individual phoneme.

5. The method according to claim 1, wherein acquiring the semantic vector corresponding to the individual phoneme comprises:
   encoding the phoneme vector corresponding to the individual phoneme to obtain the semantic vector corresponding to the individual phoneme.

6. A chip, comprising: a memory and a processor;
   the memory stores a computer program;
   the processor runs the computer program to execute the text information processing method of claim 1.

7. A text information processing apparatus, wherein the apparatus is applied in a smart device that synthesizes voice audio according to text information, the apparatus comprising:
   at least one processor and a memory;
   the memory stores computer-executable instructions;
   the at least one processor executes the computer-executable instructions stored in the memory, causing the at least one processor to:
   acquire a phoneme vector corresponding to an individual phoneme and a semantic vector corresponding to the individual phoneme in the text information;
   acquire first semantic information output at a previous moment, wherein the first semantic information is semantic information corresponding to part of the text information in the text information, and the part of the text information is text information that has been converted into voice information;
   process the first semantic information and the semantic vector corresponding to the individual phoneme by a first preset model to obtain a semantic matching degree, wherein the first preset model is obtained by learning multiple groups of first samples, and each group of the multiple groups of first samples includes learning semantic information and learning semantic vectors;
   determine a semantic context vector according to the semantic matching degree and the semantic vector corresponding to the individual phoneme;
   determine a phoneme context vector according to the semantic matching degree and the phoneme vector corresponding to the individual phoneme;
   combine the semantic context vector and the phoneme context vector to determine a context vector corresponding to a current moment;
   determine voice information at the current moment according to the context vector and the first semantic information; and
   perform voice synthesis processing on voice information at all moments to obtain voice audio corresponding to the text information.

8. The apparatus according to claim 7, wherein the at least one processor is specifically caused to:
   determine second semantic information corresponding to the current moment according to the context vector and the first semantic information; and
   perform Mel spectrum network mapping processing on the second semantic information to obtain the voice information at the current moment.

9. The apparatus according to claim 7, wherein the at least one processor is specifically caused to:
   acquire a phoneme sequence of the text information, wherein the phoneme sequence includes at least one phoneme; and
   determine the phoneme vector corresponding to the individual phoneme according to the at least one phoneme.

10. The apparatus according to claim 9, wherein the at least one processor is specifically caused to:
    find an identifier corresponding to the individual phoneme in a preset phoneme list; and
    search for the phoneme vector corresponding to the individual phoneme in a preset phoneme lookup table according to the identifier corresponding to the individual phoneme.

11. The apparatus according to claim 7, wherein the at least one processor is specifically caused to:
    encode the phoneme vector corresponding to the individual phoneme to obtain the semantic vector corresponding to the individual phoneme.

12. A non-transitory computer-readable storage medium, wherein the non-transitory computer-readable storage medium is applied in a smart device that synthesizes voice audio according to text information, computer-executable instructions are stored in the computer-readable storage medium and when a processor executes the computer-executable instructions, the following steps are executed:
    acquiring a phoneme vector corresponding to an individual phoneme and a semantic vector corresponding to the individual phoneme in the text information;
    acquiring first semantic information output at a previous moment, wherein the first semantic information is semantic information corresponding to part of the text information in the text information, and the part of the text information is text information that has been converted into voice information;
    processing the first semantic information and the semantic vector corresponding to the individual phoneme by a first preset model to obtain a semantic matching degree, wherein the first preset model is obtained by learning multiple groups of first samples, and each group of the multiple groups of first samples includes learning semantic information and learning semantic vectors;

determining a semantic context vector according to the semantic matching degree and the semantic vector corresponding to the individual phoneme;

determining a phoneme context vector according to the semantic matching degree and the phoneme vector corresponding to the individual phoneme;

combining the semantic context vector and the phoneme context vector to determine a context vector corresponding to a current moment;

determining voice information at the current moment according to the context vector and the first semantic information; and performing voice synthesis processing on voice information at all moments to obtain voice audio corresponding to the text information.

13. The non-transitory computer-readable storage medium according to claim 12, wherein determining the voice information at the current moment according to the context vector and the first semantic information comprises:

determining second semantic information corresponding to the current moment according to the context vector and the first semantic information; and performing Mel spectrum network mapping processing on the second semantic information to obtain the voice information at the current moment.

14. The non-transitory computer-readable storage medium according to claim 12, wherein when the processor executes the computer-executable instructions, the following steps are executed:

acquiring a phoneme sequence of the text information, wherein the phoneme sequence includes at least one phoneme; and determining the phoneme vector corresponding to the individual phoneme according to the at least one phoneme.

15. The non-transitory computer-readable storage medium according to claim 14, wherein when the processor executes the computer-executable instructions, the following steps are executed:

finding an identifier corresponding to the individual phoneme in a preset phoneme list; and searching for the phoneme vector corresponding to the individual phoneme in a preset phoneme lookup table according to the identifier corresponding to the individual phoneme.

16. The non-transitory computer-readable storage medium according to claim 12, wherein when the processor executes the computer-executable instructions, the following steps are executed:

encoding the phoneme vector corresponding to the individual phoneme to obtain the semantic vector corresponding to the individual phoneme.

* * * * *